(No Model.)  W. AHLERS.  2 Sheets—Sheet 1.
CORN PLANTER.

No. 528,842.  Patented Nov. 6, 1894.

Witnesses
David E. Blum
Louis G. Bischof

Inventor:
William Ahlers (No Model.) 2 Sheets—Sheet 2.

W. AHLERS.
CORN PLANTER.

No. 528,842. Patented Nov. 6, 1894.

Witnesses:
David E. Blum
Louis G. Bischof

Inventor.
William Ahlers

UNITED STATES PATENT OFFICE.

WILLIAM AHLERS, OF PYATT, ILLINOIS.

CORN-PLANTER.

SPECIFICATION forming part of Letters Patent No. 528,842, dated November 6, 1894.

Application filed April 16, 1894. Serial No. 507,808. (No model.)

*To all whom it may concern:*

Be it known that I, WILLIAM AHLERS, a citizen of the United States, residing at Pyatt, in the county of Perry and State of Illinois, have invented certain new and useful Improvements in Corn-Planters, of which the following is a full, clear, and exact description.

My invention relates to corn planting machines, and its object is to provide an improved construction of the same which shall possess superior advantages with respect to efficiency in operation.

The invention consists in the novel construction and combination of parts hereinafter fully described and claimed.

Figure 1:
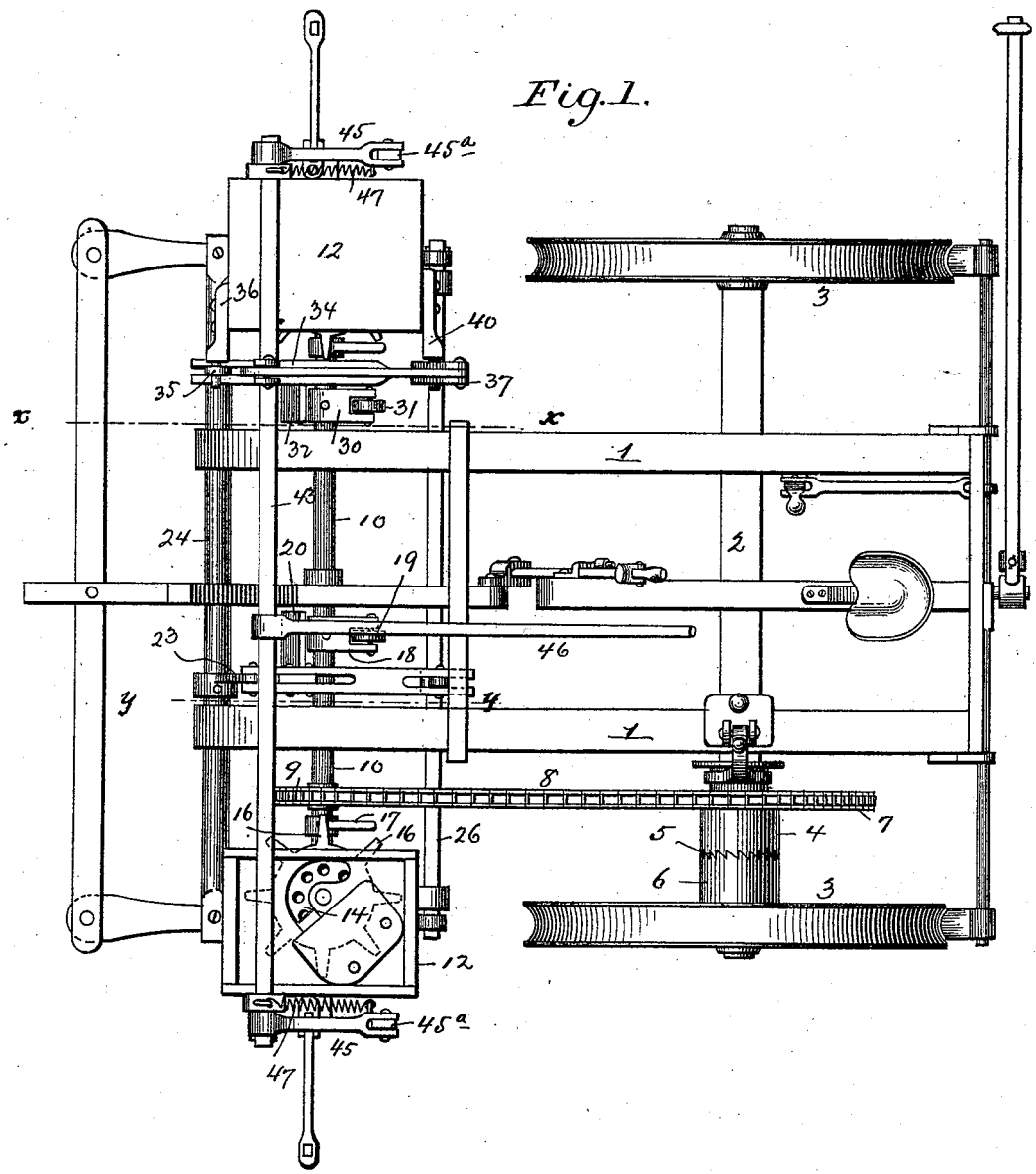
Figure 2:
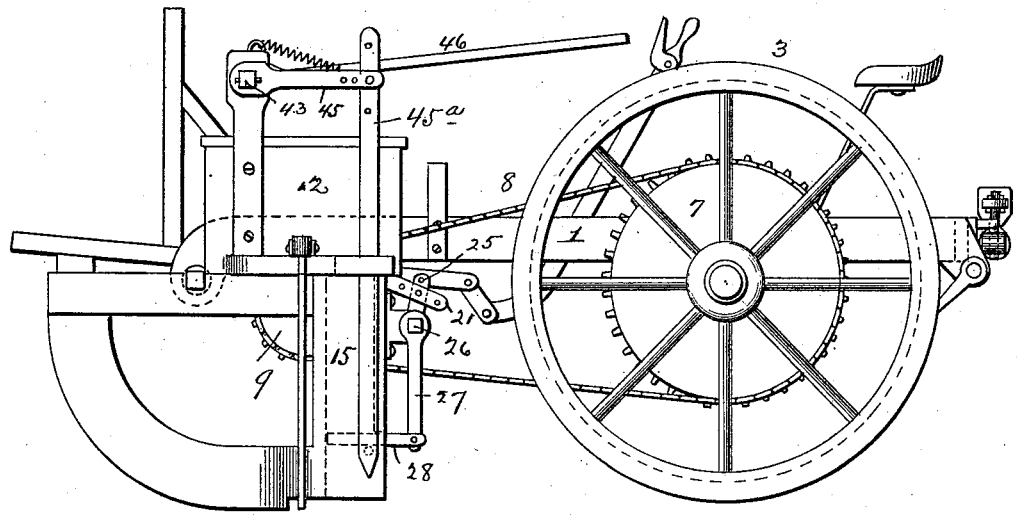
Figure 3:
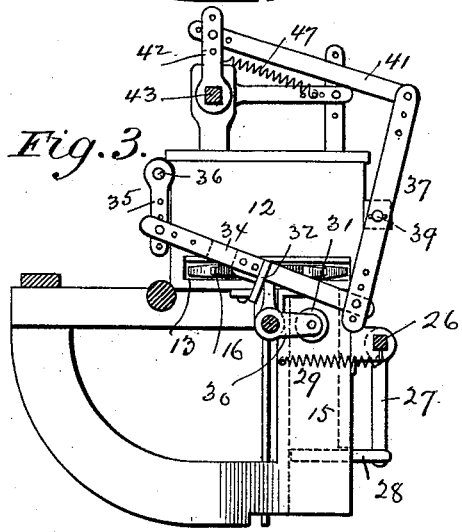
Figure 4:
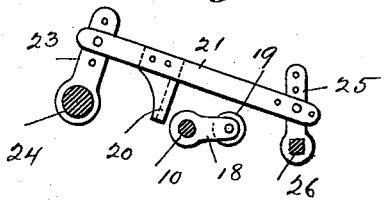

In the accompanying drawings, Figure 1 is a plan view of a corn planter constructed in accordance with my invention. Fig. 2 is a side elevation of the same; Fig. 3, a transverse sectional view, on the line $x$, $x$, Fig. 1, and Fig. 4 a similar view on the line $y$, $y$.

In the said drawings the reference numeral 1 designates the frame of the machine; 2, the axle and 3 the wheels. Near one end the axle is provided with a slidable thimble or sleeve 4, one end of which is formed with a series of teeth 5, which engage with similar teeth on a sleeve 6 secured to one of the wheel hubs, thus forming a clutch. Mounted upon sleeve 4 is a sprocket-wheel 7, connected by means of a chain 8 with a sprocket wheel 9, on a shaft 10, journaled in the front part of the runner frame hinged to the wheel frame. The numeral 12, designates the corn boxes, at each side of the runner frame, provided with a chamber 13, in the bottom of which is located a rotatable feed disk 14, having a number of openings therein, to receive one or more grains of corn, as may be desired. This chamber communicates with the corn box, and at its bottom is provided with an opening communicating with the conductor 15. The feed disk or wheel is provided with a series of peripheral arms or spurs 16, with which is adapted to engage an arm 17 on the shaft 10. Eight of these arms are shown on said disk and there is a corresponding number of holes in the disk so that as said shaft rotates the said disk is rotated one eighth of a revolution.

Near its center the shaft 10 is provided with an arm 18, carrying a roller 19, at its free end, which as said shaft rotates will strike a projecting plate 20, secured to a bar 21, the front end of which is pivoted to a crank arm 23, journaled on a transverse rod 24. The other end of bar 21 is pivoted to a crank 25, secured to an oscillating shaft 26. This shaft at each end is provided with a downwardly depending rod 27, which is pivoted to a slide 28, located in the lower end of the shoes or conductors. When the shaft 10 is rotated the roller 19 of arm 18 will strike the plate 20 and through the connections described will actuate the slides to allow the corn fed to the shoe to drop. A coiled spring 29 returns the slide to normal after the corn is dropped.

For the purpose of marking the place where the last hill of corn is dropped at the ends of each row I provide the following means: Near one end the shaft 10 is provided with an arm 30 having a roller 31 at its free end. This roller as the shaft rotates is adapted to strike a plate 32 secured to a bar 34, the front end of which is pivoted to a crank 35, journaled on an arm 36, secured to one of the corn boxes. The other end of the bar is pivoted to a lever 37, fulcrumed at 39, to an arm or lug 40, secured to the corn box. To the upper end of this lever is pivoted a bar 41, the opposite end of which is pivoted to a crank 42, secured to a transverse oscillating shaft 43. This shaft at each end is provided with a lateral arm 45, which is connected with a vertical bar 45$^a$, the lower end of which is pointed, so that as it is moved up and down as by the means just described it will mark the place where the last hill of corn is dropped at the ends of each row. A hand lever 46, may be connected with shaft 43, so that greater pressure may be applied to the marker, if desired. A coiled spring 47, returns the said parts to normal.

By actuating the lever 46 in a reverse direction, the lower end of the lever 37, will be forced backward, which will cause the bar 34, to be elevated so that the roller 31, will not strike the plate 32, and the marker will not be operated.

Having thus fully described my invention, what I claim is—

1. In a corn planter, the combination with the transverse rotatable shaft, the arm provided with a roller, secured thereto, the plate with which said roller engages, the bar to which said plate is secured, the pivoted crank or arm to which said bar is pivoted, the lever to which said bar is also pivoted, the bar connected with the upper end of said lever and with a crank secured to an oscillating shaft, the lateral arms secured to said shaft, and the vertical markers connected with said arms, substantially as described.

2. In a corn planter, the combination with the transverse rotatable shaft and the hand lever secured thereto, of the arm secured to said shaft, provided with a roller, the plate with which said roller engages, the bar to which said plate is secured, the pivoted crank or arm to which said bar is connected, the lever to which the opposite end of said bar is pivoted, the bar connected with the upper end of said lever, the crank secured to a transverse shaft and connected with said bar, the lateral arms secured to said shaft, and the markers connected with said arms, substantially as described.

WILLIAM AHLERS.

Witnesses:
DAVID E. BLUM,
WILLIAM W. KANE.